US008970741B2

United States Patent
Yamashita

(10) Patent No.: US 8,970,741 B2
(45) Date of Patent: Mar. 3, 2015

(54) IMAGING APPARATUS, IMAGE QUALITY CORRECTION METHOD OF IMAGING APPARATUS, INTERCHANGEABLE LENS AND IMAGING APPARATUS BODY

(71) Applicant: FUJIFILM Corporation, Tokyo (JP)

(72) Inventor: Hayato Yamashita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/318,029

(22) Filed: Jun. 27, 2014

(65) Prior Publication Data

US 2014/0307127 A1 Oct. 16, 2014

Related U.S. Application Data

(63) Continuation of application No. PCT/JP2012/082233, filed on Dec. 12, 2012.

(30) Foreign Application Priority Data

Dec. 28, 2011 (JP) .................................. 2011-288031

(51) Int. Cl.
| | |
|---|---|
| H04N 5/217 | (2011.01) |
| H04N 5/357 | (2011.01) |
| H04N 5/232 | (2006.01) |
| H04N 9/04 | (2006.01) |

(52) U.S. Cl.
CPC ......... *H04N 5/3572* (2013.01); *H04N 5/23209* (2013.01); *H04N 5/23225* (2013.01); *H04N 9/045* (2013.01)
USPC .......................................... 348/241; 348/335

(58) Field of Classification Search
USPC ...................................... 348/222.1, 241, 335
See application file for complete search history.

(56) References Cited

U.S. PATENT DOCUMENTS

| | | | |
|---|---|---|---|
| 8,269,865 | B2 | 9/2012 | Yamauchi |
| 8,558,925 | B2 | 10/2013 | Yamauchi |
| 2002/0094131 | A1 | 7/2002 | Shirakawa |
| 2010/0134660 | A1 | 6/2010 | Yamauchi |
| 2012/0293681 | A1 | 11/2012 | Yamauchi |

FOREIGN PATENT DOCUMENTS

| | | |
|---|---|---|
| JP | 2000-196953 A | 7/2000 |
| JP | 2000-236480 A | 8/2000 |
| JP | 2002-218298 A | 8/2002 |
| JP | 2005-151036 A | 6/2005 |
| JP | 2010-130583 A | 6/2010 |

OTHER PUBLICATIONS

International Search Report for PCT/JP2012/082233 mailed on Feb. 26, 2013.
Written Opinion of the International Searching Authority for PCT/JP2012/082233 mailed on Feb. 26, 2013.

*Primary Examiner* — Gevell Selby
(74) *Attorney, Agent, or Firm* — Birch, Stewart, Kolasch & Birch, LLP

(57) ABSTRACT

An imaging apparatus includes a condenser lens optical system and a solid-state imaging device so that a pencil of incident light rays passing through the condenser lens optical system and then incident on the solid-state imaging device can be converged in a conical shape with a result that an image of the pencil of incident light rays can be formed on one point of a light receiving surface of the solid-state imaging device due to light condensing effect of the condenser lens optical system, and the imaging apparatus further includes a correcting portion which performs image quality correction on a taken image signal outputted from the solid-state imaging device in accordance with set correction quantities; and each of the correction quantities is defined in accordance with an image height direction angle width and an incidence angle as defined herein.

15 Claims, 13 Drawing Sheets

FIG. 5

CORRECTION COEFFICIENT SELECTION TABLE 43a

| ANGLE WIDTH [°] BETWEEN UPPER AND LOWER LIGHT RAYS \ CENTER ANGLE [°] BETWEEN UPPER AND LOWER LIGHT RAYS | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|---|---|---|---|---|---|---|---|
| 20 | 0 | 0 | 0 | 0 | 0 | -1 | -1 | -1 | 1 | 1 | 2 | 2 | 2 | 2 | 2 | 3 | 3 | 3 | 3 | 3 | 3 | 3 | 4 | 4 | 4 | 4 | 5 | 5 | 5 | 5 |
| 19 | 0 | 0 | 0 | 0 | 0 | -1 | -1 | -1 | 1 | 1 | 2 | 2 | 2 | 2 | 2 | 3 | 3 | 3 | 3 | 3 | 3 | 3 | 4 | 4 | 4 | 4 | 5 | 5 | 5 | 5 |
| 18 | 0 | 0 | 0 | 0 | 0 | -1 | -1 | -1 | 1 | 1 | 2 | 2 | 2 | 2 | 2 | 3 | 3 | 3 | 3 | 3 | 3 | 3 | 4 | 4 | 4 | 4 | 4 | 5 | 5 | 5 |
| 17 | 0 | 0 | 0 | 0 | 0 | -1 | -1 | -1 | 1 | 1 | 2 | 2 | 2 | 2 | 2 | 3 | 3 | 3 | 3 | 3 | 3 | 3 | 4 | 4 | 4 | 4 | 4 | 4 | 4 | 4 |
| 16 | 0 | 0 | 0 | 0 | 0 | -1 | -1 | -1 | 1 | 1 | 2 | 2 | 2 | 2 | 2 | 3 | 3 | 3 | 3 | 3 | 3 | 3 | 3 | 4 | 4 | 4 | 4 | 4 | 4 | 4 |
| 15 | 0 | 0 | 0 | 0 | 0 | -1 | -1 | -1 | 1 | 1 | 2 | 2 | 2 | 2 | 2 | 3 | 3 | 3 | 3 | 3 | 3 | 3 | 3 | 3 | 3 | 4 | 4 | 4 | 4 | 4 |
| 14 | 0 | 0 | 0 | 0 | 0 | -1 | -1 | -1 | 1 | 1 | 2 | 2 | 2 | 2 | 2 | 3 | 3 | 3 | 3 | 3 | 3 | 3 | 3 | 3 | 3 | 3 | 3 | 3 | 3 | 3 |
| 13 | 0 | 0 | 0 | 0 | 0 | -1 | -1 | -1 | 1 | 1 | 2 | 2 | 2 | 2 | 2 | 2 | 3 | 3 | 3 | 3 | 3 | 3 | 3 | 3 | 3 | 3 | 3 | 3 | 3 | 3 |
| 12 | 0 | 0 | 0 | 0 | 0 | -1 | -1 | -1 | 1 | 1 | 2 | 2 | 2 | 2 | 2 | 2 | 2 | 3 | 3 | 3 | 3 | 3 | 3 | 3 | 3 | 3 | 3 | 3 | 3 | 3 |
| 11 | 0 | 0 | 0 | 0 | 0 | -1 | -1 | -1 | 1 | 1 | 2 | 2 | 2 | 2 | 2 | 2 | 2 | 2 | 3 | 3 | 3 | 3 | 3 | 3 | 3 | 3 | 3 | 3 | 3 | 3 |
| 10 | 0 | 0 | 0 | 0 | 0 | -1 | -1 | -1 | 1 | 1 | 2 | 2 | 2 | 2 | 2 | 2 | 2 | 2 | 2 | 2 | 2 | 2 | 3 | 3 | 3 | 3 | 3 | 3 | 3 | 3 |
| 9 | 0 | 0 | 0 | 0 | 0 | 0 | -1 | -1 | 1 | 1 | 1 | 2 | 2 | 2 | 2 | 2 | 2 | 2 | 2 | 2 | 2 | 2 | 2 | 2 | 3 | 3 | 3 | 3 | 3 | 3 |
| 8 | 0 | 0 | 0 | 0 | 0 | 0 | 0 | -1 | 1 | 1 | 1 | 1 | 1 | 2 | 2 | 2 | 2 | 2 | 2 | 2 | 2 | 2 | 2 | 2 | 2 | 3 | 3 | 3 | 3 | 3 |
| 7 | 0 | 0 | 0 | 0 | 0 | 0 | 0 | 0 | 1 | 1 | 1 | 1 | 1 | 1 | 2 | 2 | 2 | 2 | 2 | 2 | 2 | 2 | 2 | 2 | 2 | 2 | 2 | 2 | 2 | 2 |
| 6 | 0 | 0 | 0 | 0 | 0 | 0 | 0 | 0 | 1 | 1 | 1 | 1 | 1 | 1 | 1 | 2 | 2 | 2 | 2 | 2 | 2 | 2 | 2 | 2 | 2 | 2 | 2 | 2 | 2 | 2 |
| 5 | 0 | 0 | 0 | 0 | 0 | 0 | 0 | 0 | 1 | 1 | 1 | 1 | 1 | 1 | 1 | 1 | 2 | 2 | 2 | 2 | 2 | 2 | 2 | 2 | 2 | 2 | 2 | 2 | 2 | 2 |
| 4 | 0 | 0 | 0 | 0 | 0 | 0 | 0 | 0 | 1 | 1 | 1 | 1 | 1 | 1 | 1 | 1 | 1 | 1 | 2 | 2 | 2 | 2 | 2 | 2 | 2 | 2 | 2 | 2 | 2 | 2 |
| 3 | 0 | 0 | 0 | 0 | 0 | 0 | 0 | 0 | 1 | 1 | 1 | 1 | 1 | 1 | 1 | 1 | 1 | 1 | 1 | 1 | 1 | 2 | 2 | 2 | 2 | 2 | 2 | 2 | 2 | 2 |
| 2 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 2 | 2 | 2 |
| 1 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

| CORRECTION COEFFICIENT NO. 2 | | 0° DIRECTION | 20° DIRECTION | ... | 340° DIRECTION |
|---|---|---|---|---|---|
| IMAGE HEIGHT 0 | R IMAGE | +1% | +0.5% | ... | +0.5% |
| | G IMAGE | +0% | +0% | ... | +0% |
| | B IMAGE | -1% | -0.5% | ... | -0.5% |
| IMAGE HEIGHT 1 | R IMAGE | +2% | +1% | ... | +1% |
| | G IMAGE | +0% | +0% | ... | +0% |
| | B IMAGE | -3% | -1.5% | ... | -1.5% |
| ... | ... | ... | ... | ... | ... |
| IMAGE HEIGHT 7 | R IMAGE | +5% | +3% | ... | +3% |
| | G IMAGE | +1% | +1% | ... | +1% |
| | B IMAGE | -7% | -6% | ... | -6% |

FIG. 9

| F-NUMBER | ZP | IP | FP | IMAGE HEIGHT | UPPER LIGHT RAY ANGLE | LOWER LIGHT RAY ANGLE |
|---|---|---|---|---|---|---|
| 1.4 | IMAGING CONDITION | IMAGING CONDITION | IMAGING CONDITION | 0 | | |
| | | | | 1 | | |
| | | | | 2 | | |
| | | | | 3 | 13 | 7 |
| | | | | 4 | | |
| | | | | 5 | | |
| | | | | 6 | | |
| | | | | 7 | | |

27

| F-NUMBER | ZP | IP | FP | IMAGE HEIGHT | UPPER LIGHT RAY ANGLE | LOWER LIGHT RAY ANGLE |
|---|---|---|---|---|---|---|
| 2.0 | IMAGING CONDITION | IMAGING CONDITION | IMAGING CONDITION | 0 | | |
| | | | | 1 | | |
| | | | | 2 | | |
| | | | | 3 | 13 | 7 |
| | | | | 4 | | |
| | | | | 5 | | |
| | | | | 6 | | |
| | | | | 7 | | |

FOR F-NUMBER=1.4

ANGLE WIDTH [°] BETWEEN UPPER AND LOWER LIGHT RAYS

| | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|---|---|---|---|---|---|---|---|
| 20 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 5 | 5 | 5 | 5 | 6 | 6 | 6 | 6 |
| 19 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 5 | 5 | 5 | 5 | 6 | 6 | 6 | 6 |
| 18 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 5 | 5 | 5 | 5 | 6 | 6 | 6 | 6 |
| 17 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 5 | 5 | 5 | 5 | 5 | 6 | 6 | 6 |
| 16 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 5 | 5 | 5 | 5 | 5 | 5 | 5 | 5 |
| 15 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 5 | 5 | 5 | 5 | 5 | 5 | 5 | 5 |
| 14 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 5 | 5 | 5 | 5 | 5 | 5 | 5 | 5 |
| 13 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 5 | 5 | 5 | 5 | 5 | 5 | 5 | 5 |
| 12 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 | 5 |
| 11 | 1 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 |
| 10 | 1 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 |
| 9 | 1 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 |
| 8 | 1 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 | 5 |
| 7 | 1 | 1 | 1 | 1 | 1 | 1 | 2 | 2 | 2 | 2 | 2 | 3 | 3 | 3 | 3 | 3 | 3 | 4 | 4 | 4 | 4 | 4 | 4 | 4 | 4 | 5 | 5 | 5 | 5 | 5 |
| 6 | 1 | 1 | 1 | 1 | 1 | 1 | 2 | 2 | 2 | 2 | 2 | 3 | 3 | 3 | 3 | 3 | 3 | 3 | 4 | 4 | 4 | 4 | 4 | 4 | 4 | 4 | 4 | 4 | 4 | 4 |
| 5 | 1 | 1 | 1 | 1 | 1 | 1 | 2 | 2 | 2 | 2 | 2 | 3 | 3 | 3 | 3 | 3 | 3 | 3 | 3 | 4 | 4 | 4 | 4 | 4 | 4 | 4 | 4 | 4 | 4 | 4 |
| 4 | 1 | 1 | 1 | 1 | 1 | 1 | 1 | 2 | 2 | 2 | 2 | 2 | 3 | 3 | 3 | 3 | 3 | 3 | 3 | 3 | 4 | 4 | 4 | 4 | 4 | 4 | 4 | 4 | 4 | 4 |
| 3 | 1 | 1 | 1 | 1 | 1 | 1 | 1 | 1 | 2 | 2 | 2 | 2 | 2 | 3 | 3 | 3 | 3 | 3 | 3 | 3 | 3 | 3 | 4 | 4 | 4 | 4 | 4 | 4 | 4 | 4 |
| 2 | 1 | 1 | 1 | 1 | 1 | 1 | 1 | 1 | 2 | 2 | 2 | 2 | 2 | 3 | 3 | 3 | 3 | 3 | 3 | 3 | 3 | 3 | 3 | 3 | 3 | 3 | 3 | 3 | 3 | 3 |
| 1 | 1 | 1 | 1 | 1 | 1 | 1 | 1 | 1 | 2 | 2 | 2 | 2 | 2 | 3 | 3 | 3 | 3 | 3 | 3 | 3 | 3 | 3 | 3 | 3 | 3 | 3 | 3 | 3 | 3 | 3 |

CORRECTION COEFFICIENT SELECTION TABLE 43a

CENTER ANGLE [°] BETWEEN UPPER AND LOWER LIGHT RAYS

FOR F-NUMBER=2

ANGLE WIDTH [°] BETWEEN UPPER AND LOWER LIGHT RAYS

| | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|---|---|---|---|---|---|---|---|
| 20 | 0 | 0 | 0 | 0 | 1 | 1 | 1 | 1 | 1 | 2 | 2 | 2 | 2 | 2 | 3 | 3 | 3 | 3 | 3 | 3 | 3 | 4 | 4 | 4 | 4 | 5 | 5 | 5 | 5 | 5 |
| 19 | 0 | 0 | 0 | 0 | 1 | 1 | 1 | 1 | 1 | 2 | 2 | 2 | 2 | 2 | 3 | 3 | 3 | 3 | 3 | 3 | 3 | 4 | 4 | 4 | 4 | 5 | 5 | 5 | 5 | 5 |
| 18 | 0 | 0 | 0 | 0 | 1 | 1 | 1 | 1 | 1 | 2 | 2 | 2 | 2 | 2 | 3 | 3 | 3 | 3 | 3 | 3 | 3 | 4 | 4 | 4 | 4 | 5 | 5 | 5 | 5 | 5 |
| 17 | 0 | 0 | 0 | 0 | 1 | 1 | 1 | 1 | 1 | 2 | 2 | 2 | 2 | 2 | 3 | 3 | 3 | 3 | 3 | 3 | 3 | 4 | 4 | 4 | 4 | 4 | 5 | 5 | 5 | 5 |
| 16 | 0 | 0 | 0 | 0 | 1 | 1 | 1 | 1 | 1 | 2 | 2 | 2 | 2 | 2 | 2 | 3 | 3 | 3 | 3 | 3 | 3 | 3 | 4 | 4 | 4 | 4 | 4 | 4 | 4 | 4 |
| 15 | 0 | 0 | 0 | 0 | 1 | 1 | 1 | 1 | 1 | 1 | 2 | 2 | 2 | 2 | 2 | 3 | 3 | 3 | 3 | 3 | 3 | 3 | 4 | 4 | 4 | 4 | 4 | 4 | 4 | 4 |
| 14 | 0 | 0 | 0 | 0 | 1 | 1 | 1 | 1 | 1 | 1 | 2 | 2 | 2 | 2 | 2 | 3 | 3 | 3 | 3 | 3 | 3 | 3 | 4 | 4 | 4 | 4 | 4 | 4 | 4 | 4 |
| 13 | 0 | 0 | 0 | 0 | 1 | 1 | 1 | 1 | 1 | 1 | 2 | 2 | 2 | 2 | 2 | 3 | 3 | 3 | 3 | 3 | 3 | 3 | 4 | 4 | 4 | 4 | 4 | 4 | 4 | 4 |
| 12 | 0 | 0 | 0 | 0 | 0 | 1 | 1 | 1 | 1 | 1 | 2 | 2 | 2 | 2 | 2 | 3 | 3 | 3 | 3 | 3 | 3 | 3 | 3 | 4 | 4 | 4 | 4 | 4 | 4 | 4 |
| 11 | 0 | 0 | 0 | 0 | 0 | 1 | 1 | 1 | 1 | 1 | 1 | 2 | 2 | 2 | 2 | 2 | 3 | 3 | 3 | 3 | 3 | 3 | 3 | 3 | 4 | 4 | 4 | 4 | 4 | 4 |
| 10 | 0 | 0 | 0 | 0 | 0 | 1 | 1 | 1 | 1 | 1 | 1 | 2 | 2 | 2 | 2 | 2 | 3 | 3 | 3 | 3 | 3 | 3 | 3 | 3 | 4 | 4 | 4 | 4 | 4 | 4 |
| 9 | 0 | 0 | 0 | 0 | 0 | 1 | 1 | 1 | 1 | 1 | 1 | 2 | 2 | 2 | 2 | 2 | 3 | 3 | 3 | 3 | 3 | 3 | 3 | 3 | 4 | 4 | 4 | 4 | 4 | 4 |
| 8 | 0 | 0 | 0 | 0 | 0 | 1 | 1 | 1 | 1 | 1 | 1 | 2 | 2 | 2 | 2 | 2 | 2 | 3 | 3 | 3 | 3 | 3 | 3 | 3 | 3 | 4 | 4 | 4 | 4 | 4 |
| 7 | 0 | 0 | 0 | 0 | 0 | 0 | 1 | 1 | 1 | 1 | 1 | 1 | 2 | 2 | 2 | 2 | 2 | 2 | 3 | 3 | 3 | 3 | 3 | 3 | 3 | 3 | 3 | 4 | 4 | 4 |
| 6 | 0 | 0 | 0 | 0 | 0 | 0 | 1 | 1 | 1 | 1 | 1 | 1 | 2 | 2 | 2 | 2 | 2 | 2 | 2 | 3 | 3 | 3 | 3 | 3 | 3 | 3 | 3 | 3 | 3 | 3 |
| 5 | 0 | 0 | 0 | 0 | 0 | 0 | 1 | 1 | 1 | 1 | 1 | 1 | 2 | 2 | 2 | 2 | 2 | 2 | 2 | 3 | 3 | 3 | 3 | 3 | 3 | 3 | 3 | 3 | 3 | 3 |
| 4 | 0 | 0 | 0 | 0 | 0 | 0 | 0 | 1 | 1 | 1 | 1 | 1 | 2 | 2 | 2 | 2 | 2 | 2 | 2 | 2 | 3 | 3 | 3 | 3 | 3 | 3 | 3 | 3 | 3 | 3 |
| 3 | 0 | 0 | 0 | 0 | 0 | 0 | 0 | 0 | 1 | 1 | 1 | 1 | 1 | 2 | 2 | 2 | 2 | 2 | 2 | 2 | 2 | 3 | 3 | 3 | 3 | 3 | 3 | 3 | 3 | 3 |
| 2 | 0 | 0 | 0 | 0 | 0 | 0 | 0 | 1 | 1 | 1 | 1 | 1 | 2 | 2 | 2 | 2 | 2 | 2 | 2 | 2 | 2 | 2 | 2 | 2 | 2 | 2 | 2 | 2 | 2 | 2 |
| 1 | 0 | 0 | 0 | 0 | 0 | 0 | 0 | 1 | 1 | 1 | 1 | 1 | 2 | 2 | 2 | 2 | 2 | 2 | 2 | 2 | 2 | 2 | 2 | 2 | 2 | 2 | 2 | 2 | 2 | 2 |

CORRECTION COEFFICIENT SELECTION TABLE 43a

CENTER ANGLE [°] BETWEEN UPPER AND LOWER LIGHT RAYS

IMAGING APPARATUS, IMAGE QUALITY CORRECTION METHOD OF IMAGING APPARATUS, INTERCHANGEABLE LENS AND IMAGING APPARATUS BODY

CROSS REFERENCE TO RELATED APPLICATION

This is a continuation of International Application No. PCT/JP2012/082233 filed on Dec. 12, 2012, and claims priority from Japanese Patent Application No. 2011-288031 filed on Dec. 28, 2011, the entire disclosures of which are incorporated herein by reference.

TECHNICAL FIELD

The present invention relates to an imaging apparatus, an image quality correction method of the imaging apparatus, an interchangeable lens and an imaging apparatus body.

BACKGROUND ART

Assume that a CCD type solid-state imaging device, a CMOS type solid-state imaging device, or the like, for taking a color image is used to take an image of a photographic image. In this case, when crosstalk of incident light occurs between adjacent pixels having color filters with different colors, deterioration of image quality is generated due to color mixture. Similarly, deterioration of image quality is also generated due to color shading in which a color of the image taken in a peripheral portion of the imaging device is shifted from the color of the image taken in a central portion of the imaging device.

Not only color mixture and color shading but also various factors are factors which deteriorate the image quality of the taken image. These occur depending on an incidence angle of incident light which passes through an imaging lens mounted in an imaging apparatus and then enters a light receiving surface of the solid-state imaging device. As the incidence is more oblique in terms of the incidence angle, the image quality is more deteriorated.

In order to avoid such deterioration of image quality, color mixture correction processing or color shading correction processing is performed on an output signal of the solid-state imaging device. For example, in the following Patent Literature 1, an F-number and a pupil distance of the lens are obtained and color mixture correction is performed by use of a color mixture correction coefficient based on the F-number and the pupil distance of the lens. In addition, in the following Patent Literature 2, shading correction is performed by use of a color correction coefficient corresponding to the incidence angle of the incident light with respect to a principal light ray, which angle is calculated based on lens information obtained from the lens.

PRIOR ART DOCUMENT

Patent Literature

Patent Literature 1: JP-A-2010-130583
Patent Literature 2: JP-A-2005-151036

SUMMARY OF INVENTION

Problem to be Solved by the Invention

However, even when different imaging lenses A and B have the same pupil positions and the same F-numbers, incidence angles at each of which light is incident on a peripheral portion of an imaging device may be different, as shown in FIG. 13. When the incidence angles are different, it is necessary to use different color mixture correction coefficients. However, in the correction method of Patent Literature 1, when the F-number and the pupil distance are the same, the same correction coefficient is used to thereby result in insufficient correction of image quality. In addition, also when correction is performed only based on the incidence angle of the incident light with respect to the principal light ray as in Patent Literature 2, it has been proved by investigation of the present inventor that sufficient correction may not be able to be performed. As shown in FIG. 13, an angle between an upper light ray and a lower light ray with respect to the principal light ray is narrowed as it goes toward a peripheral portion of the imaging device. The main cause of the narrowed angle between the upper and lower light rays is vignetting inside the imaging lens.

An object of the invention is to provide an imaging apparatus, an image quality correction method of the imaging apparatus, an interchangeable lens and an imaging apparatus body, by which deterioration of image quality caused by oblique incident light can be corrected properly.

Means for Solving the Problem

According to an imaging apparatus and an image quality correction method of the imaging apparatus according to the invention, there is provided an imaging apparatus including a condenser lens optical system and a solid-state imaging device so that a pencil of incident light rays passing through the condenser lens optical system and then incident on the solid-state imaging device can be converged in a conical shape with a result that an image of the pencil of incident light rays can be formed on one point of a light receiving surface of the solid-state imaging device due to light condensing effect of the condenser lens optical system, characterized in that:

the imaging apparatus further includes a correcting portion which performs image quality correction on a taken image signal outputted from the solid-state imaging device in accordance with set correction quantities; and each of the correction quantities is defined in accordance with an image height direction angle width and an incidence angle, the image height direction angle width serving as an angle width between two light rays obtained when a peripheral wall surface of the conical shape of the pencil of light rays intersects with a plane which passes through the center of the light receiving surface of the solid-state imaging device and which is perpendicular to the light receiving surface, the incidence angle serving as an angle between a center line bisecting the image height direction angle width and a normal line of the light receiving surface.

Further preferably, the imaging apparatus according to the invention is characterized in that:

the imaging apparatus further includes an imaging lens which has the condenser lens optical system and a diaphragm, and an imaging apparatus body on which the imaging lens is mounted; and the imaging apparatus body includes:
a storage portion which stores the correction quantities; and
a correction quantity selecting portion which retrieves data stored in the storage portion based on incidence angle information of the imaging lens about the image height direction angle width and the incidence angle, and obtains a corresponding correction quantity.

An interchangeable lens according to the invention is an interchangeable lens detachably mounted on the imaging apparatus body of the imaging apparatus, characterized in that: the interchangeable lens holds the incidence angle information or information from which the incidence angle information can be calculated.

An imaging apparatus body according to the invention is characterized by being the imaging apparatus body.

Advantageous Effects of Invention

According to the invention, deterioration of image quality caused by oblique incident light is corrected by use of a correction quantity corresponding to information about a light ray pencil condensing angle of a pencil of incident light rays entering a solid-state imaging device. Accordingly, even image quality of a signal detected by pixels in a peripheral portion of the imaging device can be corrected to high quality.

BRIEF DESCRIPTION OF DRAWINGS

FIG. 5 A view showing an example of a correction coefficient selection table.

FIG. 7 A view for explaining an operation for determining correction coefficients.

FIG. 8 A view showing a configuration example of a correction coefficient storage region of a memory shown in FIG. 1.

FIG. 9 A view for explaining another embodiment of lens incidence angle information.

FIG. 10 A view showing an example of a correction coefficient selection table for each F-number.

DESCRIPTION OF EMBODIMENTS

An embodiment of the invention will be described below with reference to the drawings.

Figure 1:
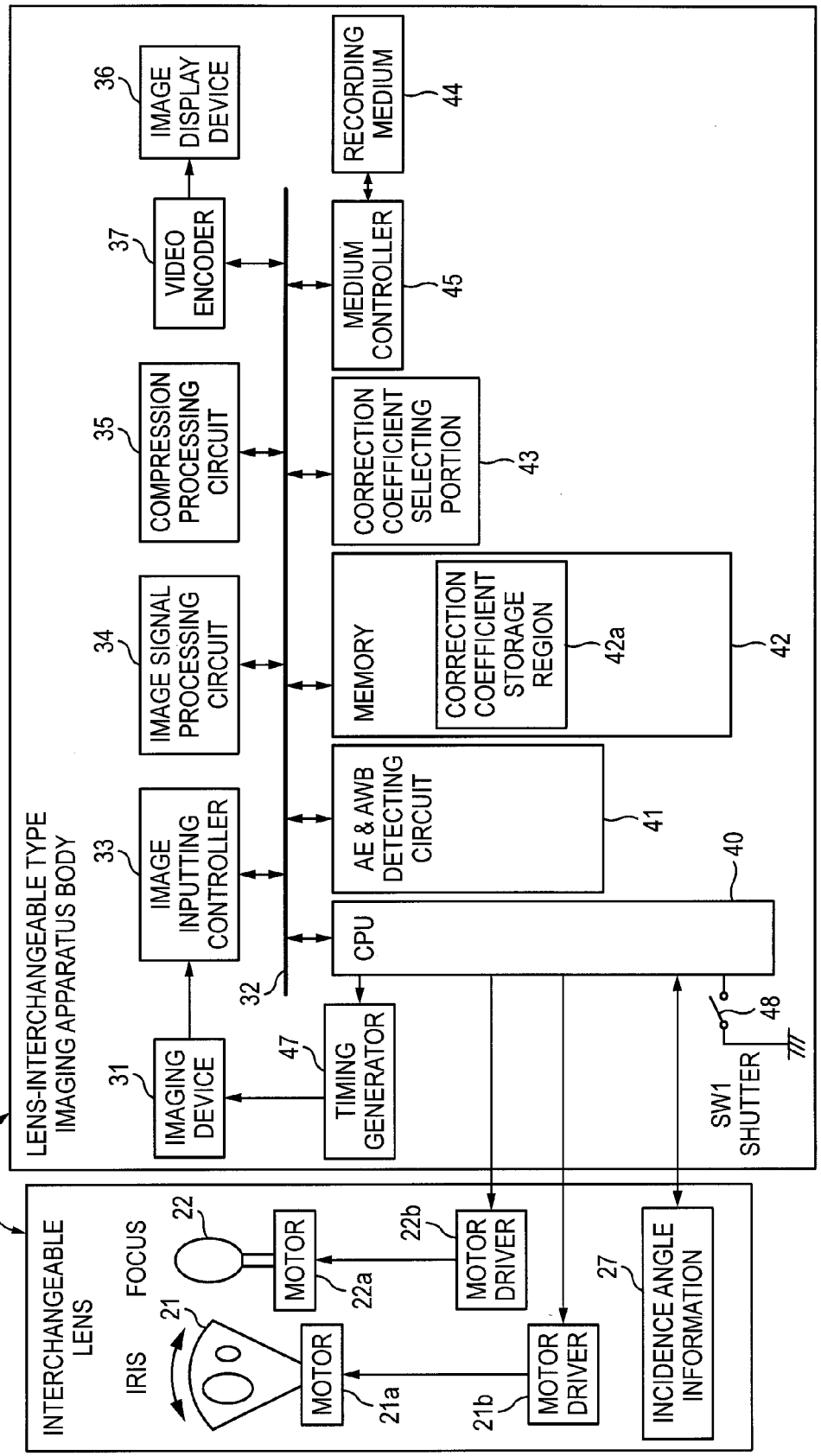
FIG. 1 A configuration view of functional blocks of an imaging apparatus according to an embodiment of the invention.

FIG. 1 is a diagram of functional blocks of a lens-interchangeable type imaging apparatus according to an embodiment of the invention. The lens-interchangeable type imaging apparatus 10 includes an interchangeable lens 20, and an imaging apparatus body (imaging apparatus) 30. The lens-interchangeable type imaging apparatus 10 is configured in such a manner that the interchangeable lens 20 desired by a user such as a wide-angle imaging system interchangeable lens 20 or a telephoto imaging system interchangeable lens 20 is mounted on the imaging apparatus body 30.

The interchangeable lens 20 includes a diaphragm (iris) 21 and a focus lens 22. In addition, when the interchangeable lens 20 is of the wide-angle imaging system, a not-shown wide angle lens is built in front of the diaphragm 21. When the interchangeable lens 20 is of the telephoto imaging system, a not-shown telephoto lens is built in front of the diaphragm 21.

The diaphragm 21 is driven by a motor 21a so that the position of the diaphragm can be changed. The motor 21a is driven by a motor driver 21b. The motor driver 21b is driven in accordance with an instruction from a CPU 40. The CPU 40 is provided inside the imaging apparatus body 30 and will be described later.

The focus lens 22 is driven by a motor 22a. The motor 22a is driven by a motor driver 22b in accordance with an instruction from the CPU 40. The focus lens 22 is driven so that an image of incident light can be formed on a light receiving surface of an imaging device 31. The imaging device 31 is provided inside the imaging apparatus body 30 and will be described later.

An ROM is built in the interchangeable lens 20. Lens incidence angle information 27 (shown in FIG. 7) of the interchangeable lens 20 is stored in the ROM. When the interchangeable lens 20 is mounted on the imaging apparatus body 30, the CPU 40 inside the imaging apparatus body 30 reads the lens incidence angle information 27 and performs various kinds of image quality correction on a taken image of a photographic subject based on the lens incidence angle information 27.

Incidentally, an example in which color mixture correction is performed as image quality correction will be described in the following embodiment. However, this embodiment may be also applied to any other correction such as color shading correction or same color level difference correction which will be described later.

A CMOS type single plate type solid-state imaging device 31 for taking a color image is disposed in the imaging apparatus body 30 in a position where an image of incident light passing through the focus lens 22 can be formed. It is a matter of course that any other type solid-state imaging device such as a CCD type solid-state imaging device may be used in place of the CMOS type solid-state imaging device 31.

Further, the imaging apparatus body 30 is provided with an image inputting controller 33 which imports an output image signal of the solid-state imaging device 31 and outputs the output image signal to a bus 32. An image signal processing circuit 34, a compression processing circuit 35, a video encoder 37, the CPU 40, a circuit 41, a memory 42, a correction coefficient selecting portion 43, and a medium controller 45 are connected to the bus 32. The image signal processing circuit 34 performs well-known image processing on the output image signal of the solid-state imaging device 31. The compression processing circuit 35 compresses the image signal which has been subjected to image processing into JPEG image data etc. The video encoder 37 displays a taken image or a through image on an image display device 36 provided in the back etc. of the imaging apparatus body 30. The CPU 40 generally controls the lens-interchangeable type imaging apparatus 10. The circuit 41 processes a signal outputted as a through image (live-view image) from the solid-state imaging device 31, and detects automatic exposure (AE) and automatic white balance (AWB). The correction coefficient selecting portion 43 operates in a manner which will be described later in detail. The medium controller 45 stores the JPEG image data into a recording medium 44. A correction coefficient data storage region 42a is provided inside the memory 42.

The solid-state imaging device 31 is driven in accordance with a timing signal from a timing generator 47. The timing generator 47 operates in accordance with an instruction from the CPU 40. A shutter release button 48 provided in the imaging apparatus body 30 is connected to the CPU 40.

Figure 2:
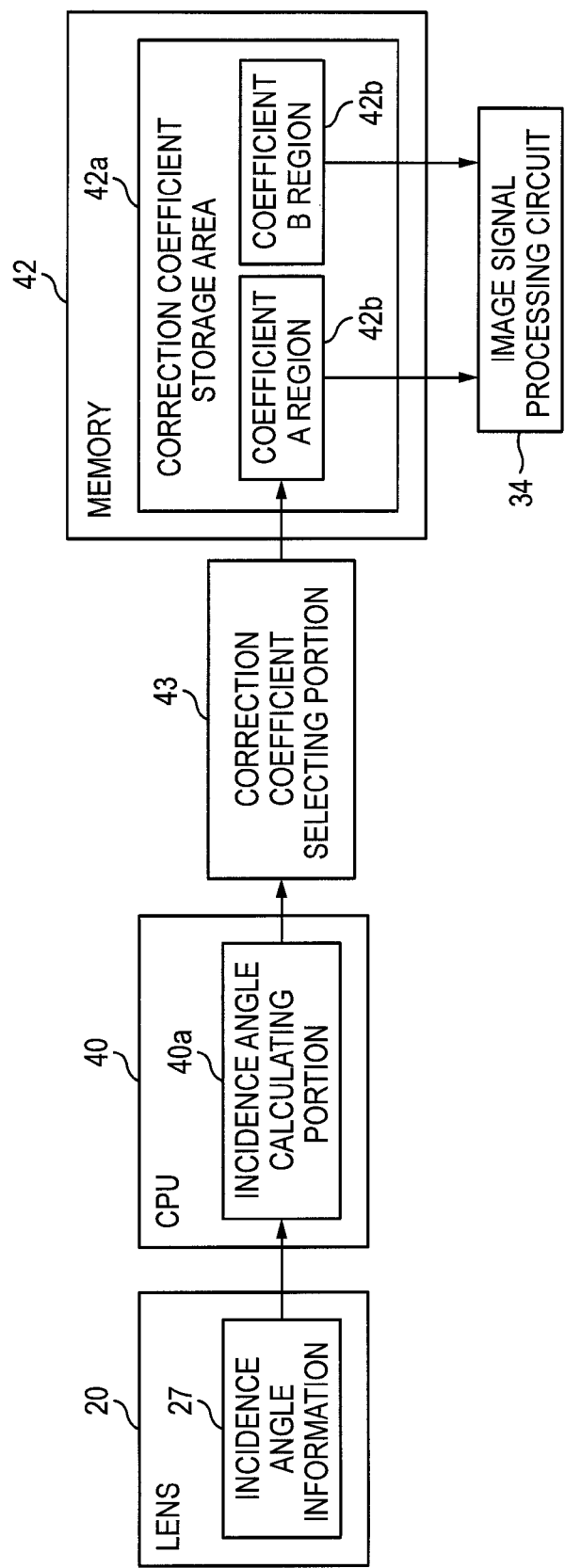
FIG. 2 A configuration view in which functional blocks used for color mixture correction are extracted from the functional blocks in FIG. 1.

FIG. 2 is a view in which only functional blocks required for performing color mixture correction are extracted from the functional blocks described in FIG. 1. The lens incidence angle information 27 provided inside the interchangeable lens 20 is read and subjected to arithmetic processing by an incidence angle calculating portion 40a of the CPU 40. The correction coefficient selecting portion 43 selects a corresponding correction coefficient number from a correction coefficient selection table exemplified in FIG. 5 in accordance with the arithmetic result of the incidence angle calculating portion 40a.

A plurality of regions 42b are included in the correction coefficient storage region 42a of the memory 42. Correction coefficients which are classified into groups A, B, . . . are stored in the regions 42b respectively in accordance with the groups. The image signal processing circuit 34 reads out correction coefficients of a corresponding region 42b from the plurality of regions 42b, and performs mixture color correction.

Figure 3:
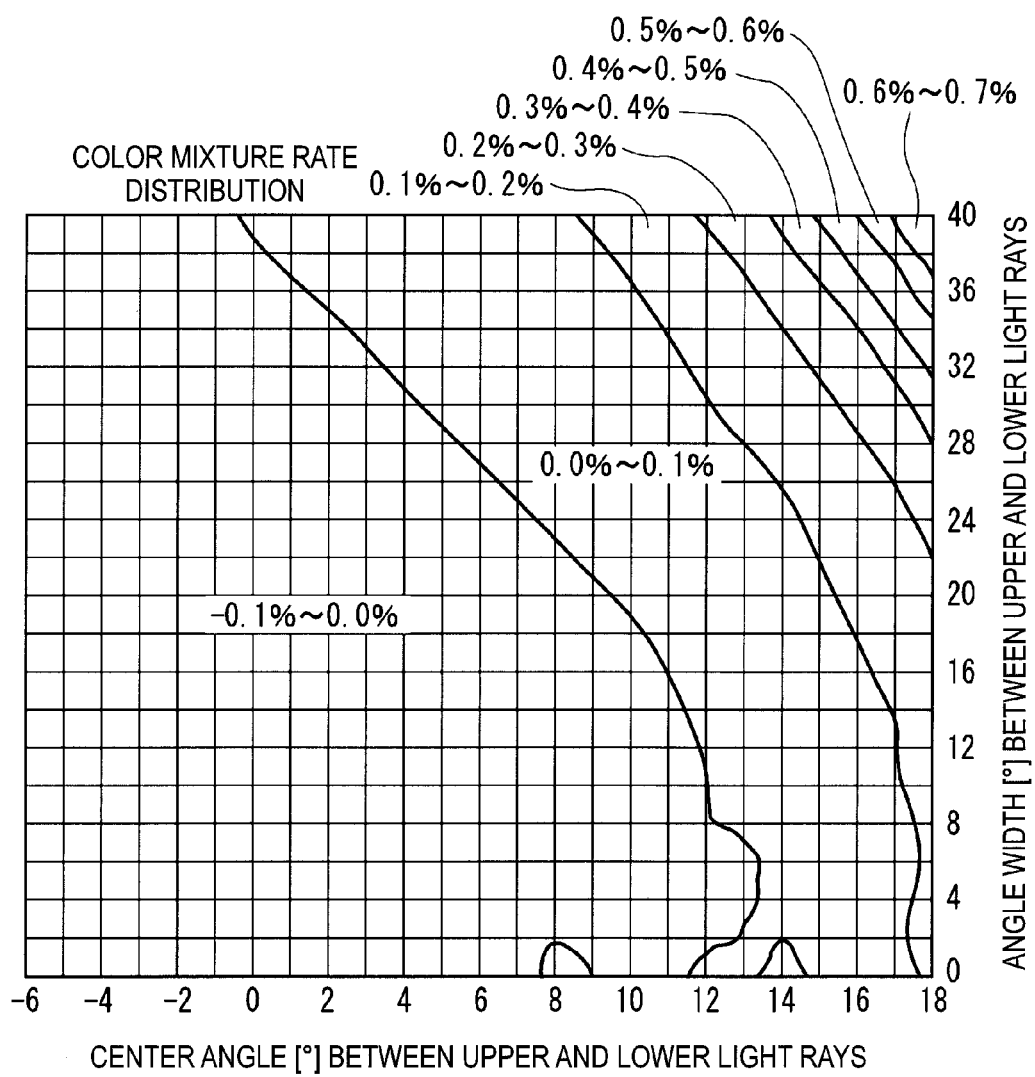
FIG. 3 A graph showing an example of a color mixture rate distribution.

FIG. 3 is a graph in which a distribution of an image quality deterioration rate (a color mixture rate in this example) of a taken image signal is obtained in coordinates in which an incidence angle of a center line between upper and lower light rays (referred to as center angle between upper and lower light rays) is indicated in the abscissa and an angle width between the upper and lower light rays (referred to as angle width between upper and lower light rays) is indicated in the ordinate. Here, the center angle [°] between the upper and lower light rays and the angle width [°] between the upper and lower light rays will be described with reference to FIG. 4.

When a pencil of light rays passing through a not-shown imaging lens and the diaphragm is incident on the light receiving surface of the imaging device 31, the pencil of light rays is condensed on the light receiving surface. The light ray passing through the center of the diaphragm is a principal light ray. The portion where the pencil of light rays is condensed is formed into a conical shape having an apex in a light condensing position. Assume that the conical shape is cut along a plane (a plane perpendicular to the surface of the imaging device) perpendicular to a line (this line serves as a line extending in an image height direction as will be described in FIG. 6) connecting the center point of the imaging device 31 and the light condensing position. In this case, one of two cutting lines extending from the light condensing position is regarded as upper light ray and the other cutting line is regarded as lower light ray. In other words, one of two light rays where a circumferential wall portion of the conical light condensing portion of the pencil of incident light rays intersects with the plane extending perpendicularly to the light receiving surface of the solid-state imaging device and in the image height direction is regarded as upper light ray, and the other light ray is regarded as lower light ray.

Figure 4:
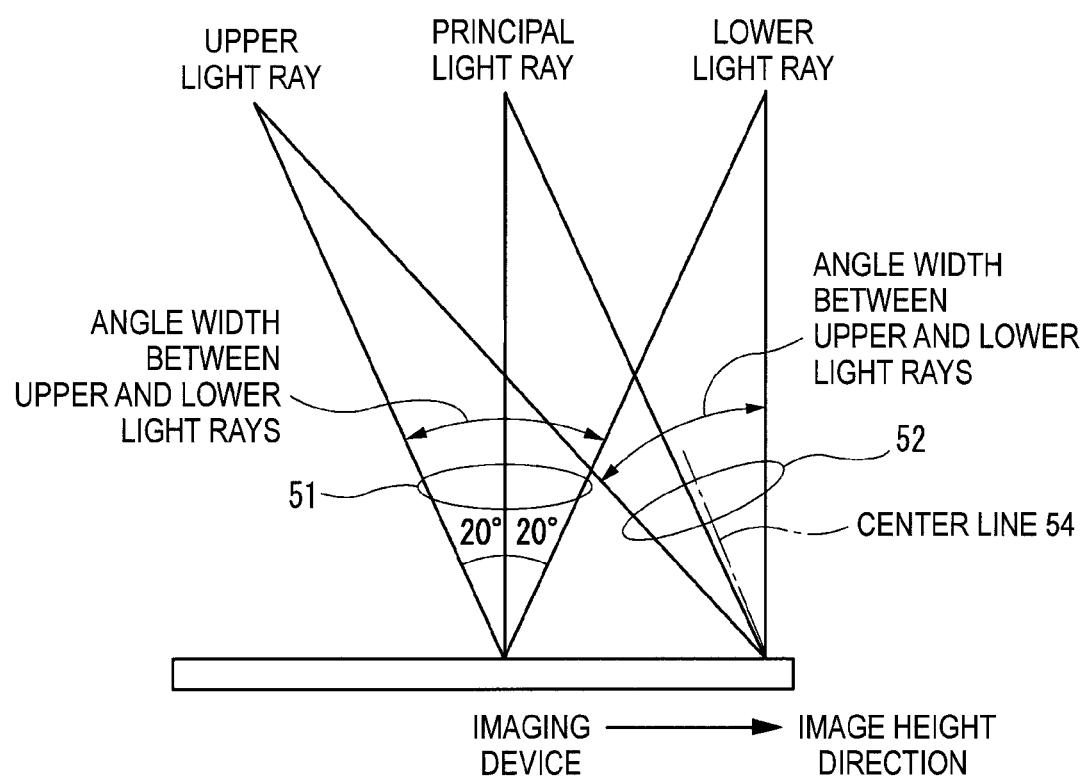
FIG. 4 A view for explaining a center angle between upper and lower light rays and an angle width between the upper and lower light rays.

A light condensing portion 51 of a pencil of light rays shown in FIG. 4 is illustrated as an example in which a principal light ray is incident on the center of the imaging device 31 vertically, an angle between the principal light ray and an upper light ray is 20° and an angle between the principal light ray and a lower light ray is −20°. An angle width between the upper and lower light rays (an angle between the upper light ray and the lower light ray) on this occasion is 40° (=20°−(−20°)) and the center angle between the upper and lower light rays (an angle between the centerline between the upper light ray and the lower light ray and a vertical line to the surface of the imaging device) is 0°.

When the pencil of light rays is obliquely incident to form a light condensing portion 52 in FIG. 4, the light condensing position is deviated toward the periphery of the imaging device 31, the angle width between the upper and lower light rays is reduced, and the center angle between the upper and lower light rays is increased in a plus (+) direction. A center line 54 of the upper and lower light rays is deviated from the principal light ray. When the pencil of light rays is incident obliquely in an opposite direction (not shown), the angle width between the upper and lower light rays is reduced and the center angle between the upper and lower light rays is increased in a minus (−) direction. Incidentally, the center angle between the upper and lower light rays changes in connection with fluctuation in the zoom magnification of the telephoto lens while the angle width between the upper and lower light rays changes in connection with fluctuation in the aperture diameter of the diaphragm.

FIG. 3 shows a graph in which the distribution of the color mixture rate of the single plate type solid-state imaging device whose color filter array is a Bayer array is obtained with the center angle between the upper and lower light rays as the abscissa and the angle width between the upper and lower light rays as the ordinate. As apparent from FIG. 3, it can be known that the color mixture rate is reduced as the pencil of light rays is incident on the imaging device more vertically, and the color mixture rate is increased as the pencil of light rays is incident on the imaging device more obliquely. In addition, when the aperture diameter of the diaphragm is increased to increase the angle width between the upper and lower light rays even in the condition that the incidence is close to vertical incidence, the quantity of obliquely incident light is increased to increase the color mixture rate.

Information about the light condensing angle in the light condensing portion of the pencil of light rays means information about a tip portion of the conical shape in which the pencil of light rays passing through the aperture of the diaphragm 21 is converged into a conical shape so that an image of the pencil of light rays can be formed on one point of the light receiving surface of the imaging device due to the light condensing effect of the lens. That is, the information is about an angle of the tip portion indicating how sharp the tip portion of the conical shape is, an angle at which the tip portion is incident on the light receiving surface, the feature of the conical shape (whether the shape is a circle, an oblate circle or a distorted cone), etc.

Figure 12:
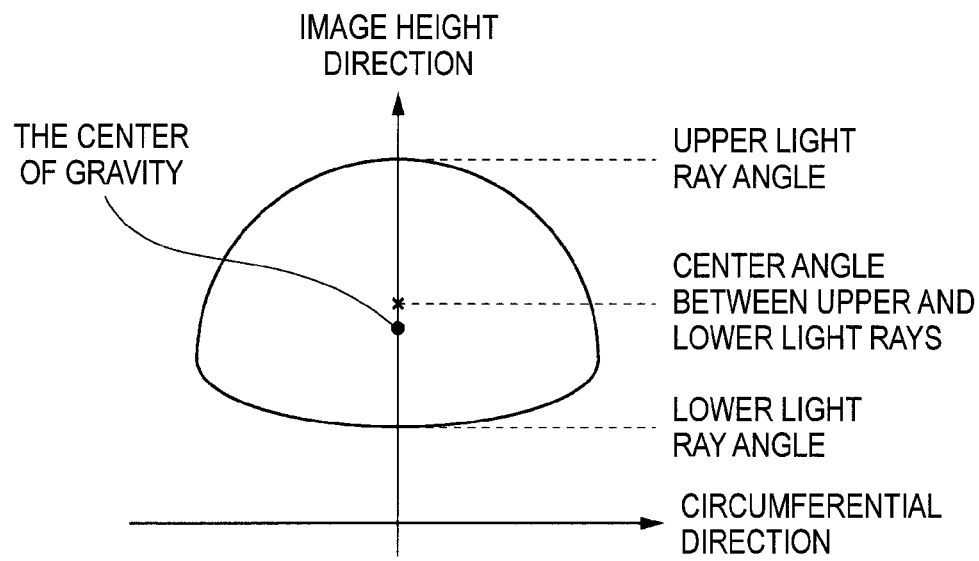
FIG. 12 A view showing an example in which an incidence angle distribution for an upper light ray differs from that for a lower light ray.
Figure 13:
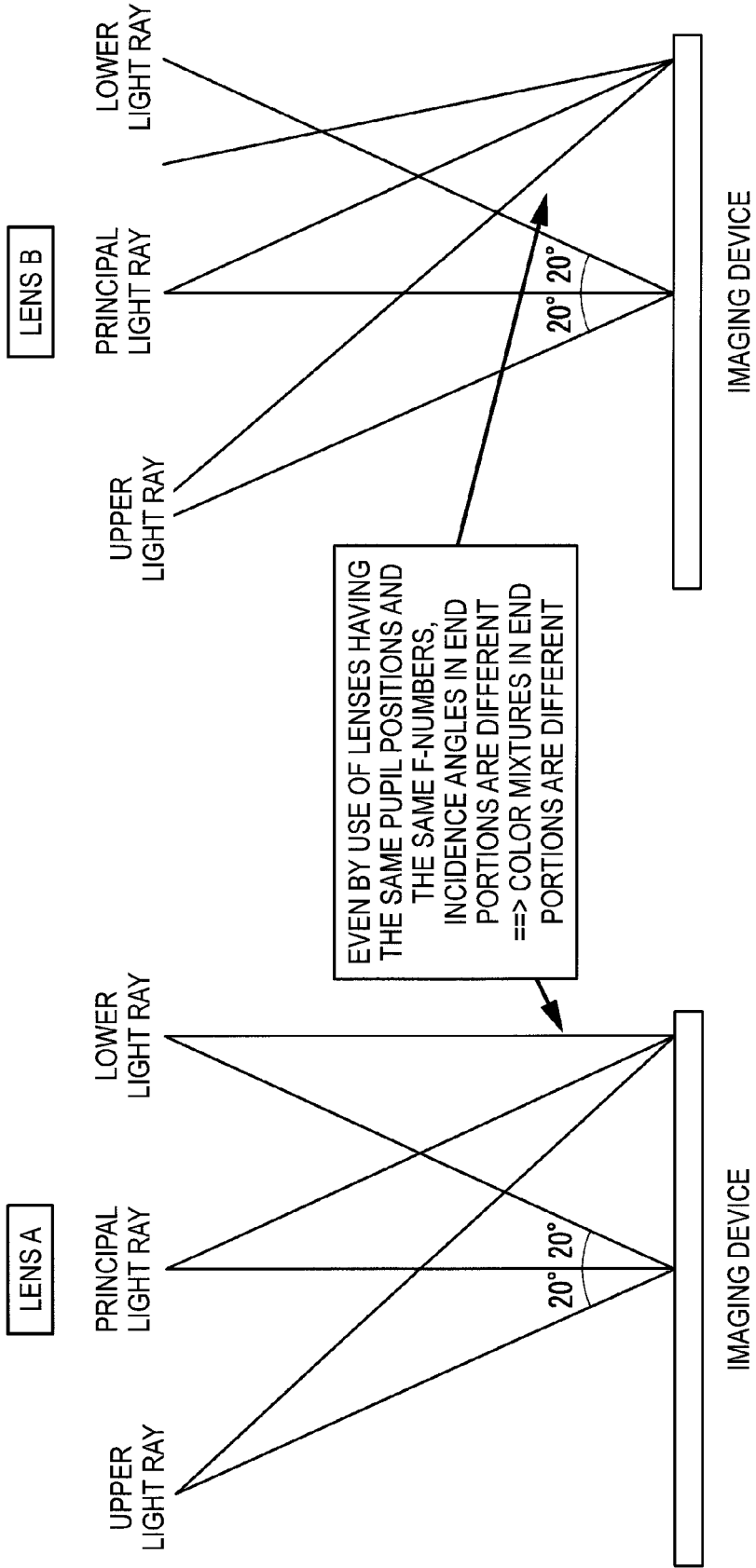
FIG. 13 A view showing an example in which incidence angles are different even by use of lenses having the same pupil positions and the same F-numbers.

Therefore, it is a matter of course that the center angle between the upper and lower light rays and the angle width between the upper and lower light rays in the aforementioned embodiment are simply one example of the information about the light condensing angle. When, for example, the center of gravity of the light condensing angle of the pencil of light rays is used as shown in FIG. 12 in place of the center angle between the upper and lower light rays, it is possible to make the correction coefficient follow the center of gravity of the light condensing angle even when there is a difference in incidence angle distribution between the incidence angle direction of the upper light ray and the incidence angle direction of the lower light ray. For example, in such a situation that there is a difference in distribution, the incidence angle distribution is asymmetric in the image height direction, for example, due to vignetting occurring only on the lower light ray side. In this case, it is considered that the correction coefficient should follow the center of gravity rather than the center angle between the upper and lower light rays.

Incidentally, the center line 54 in FIG. 4 showing the angle at which the tip portion of the conical shape is incident on the light receiving surface is different from the principal light ray. The principal light ray is not a parameter expressing the information about the light condensing angle but merely expresses a light ray passing through the center of the diaphragm and the center of the lens.

That is, the color mixture rate is higher as the incident light is more oblique and the aperture diameter of the diaphragm is larger. The color mixture rate is lower as the incidence is more vertical and the aperture diameter of the diaphragm is smaller. In FIG. 3, the color mixture rate is expressed by range at intervals of 0.1%.

FIG. 5 is a view showing an example of a correction coefficient selection table prepared in the correction coefficient selecting portion 43 in FIG. 2. In a correction coefficient selection table 43a shown in FIG. 5, one correction coefficient number (No.) of 0 to 5 is assigned to each of entries in which center angles between upper and lower light rays are indicated in the abscissa direction and at an interval of 1 degree and angle widths between the upper and lower light rays are indicated in the ordinate direction and at an interval of 1 degree. Each correction coefficient number expresses a group number to which a group of correction coefficients belong, as will be shown later in FIG. 8 by way of example. In the embodiment, correction coefficients are shared among correction coefficients for positions of center angles between upper and lower light rays and positions of angle widths between the upper and lower light rays when the correction coefficient number is same. The same correction coefficient is used for color mixture correction so that the volume of data for the correction coefficients can be reduced.

The correction coefficient selection table is provided for each image height. The image height means a distance from the light receiving surface center (the optical axis center) in the light receiving surface of the solid-state imaging device 31 as shown in (a) of FIG. 6. As the light condensing position of the pencil of light rays is more deviated in the image height direction, the incidence is more oblique. That is, the center angle between the upper and lower light rays and the angle width between the upper and lower light rays described in FIG. 4 change. The angle width between the upper and lower light rays is the same as the angle width in the image height direction in the conical light condensing portion. Incidentally, a perpendicular direction to the image height direction is referred to as circumferential direction.

The value of the center angle between the upper and lower light rays and the value of the angle width between the upper and lower light rays differ from one imaging lens to another in spite of the same image height. In addition, the incidence angle on a peripheral portion of the imaging device 31 differs from one imaging lens to another in spite of the same pupil position and the same F-number, causing a variation in color mixture rate in the peripheral portion of the imaging device 31.

Figure 6:
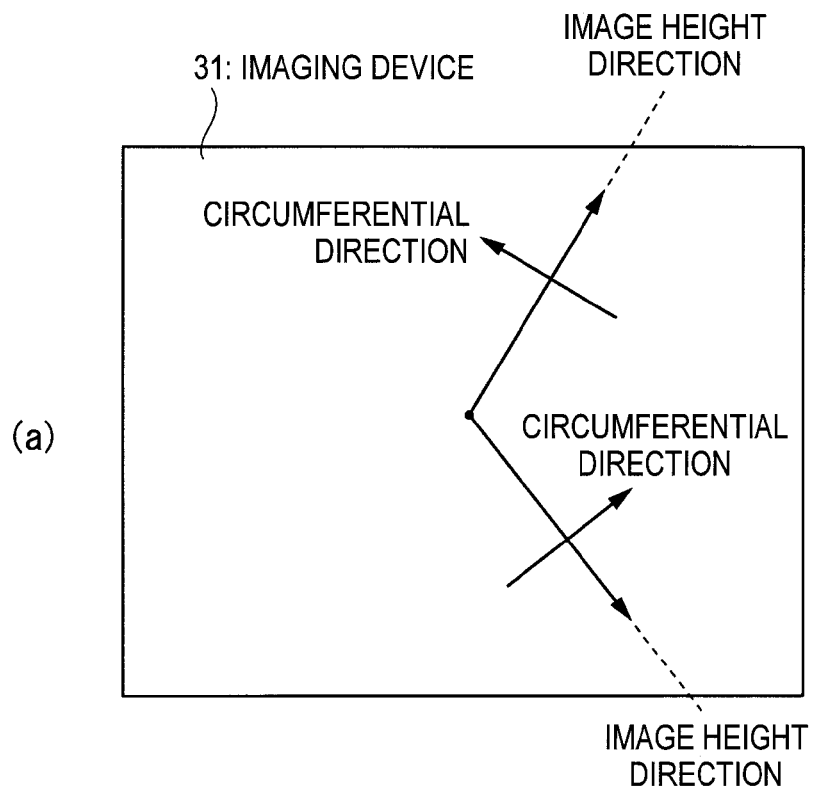
FIG. 6 A view for explaining image heights of a lens.
Figure 6:
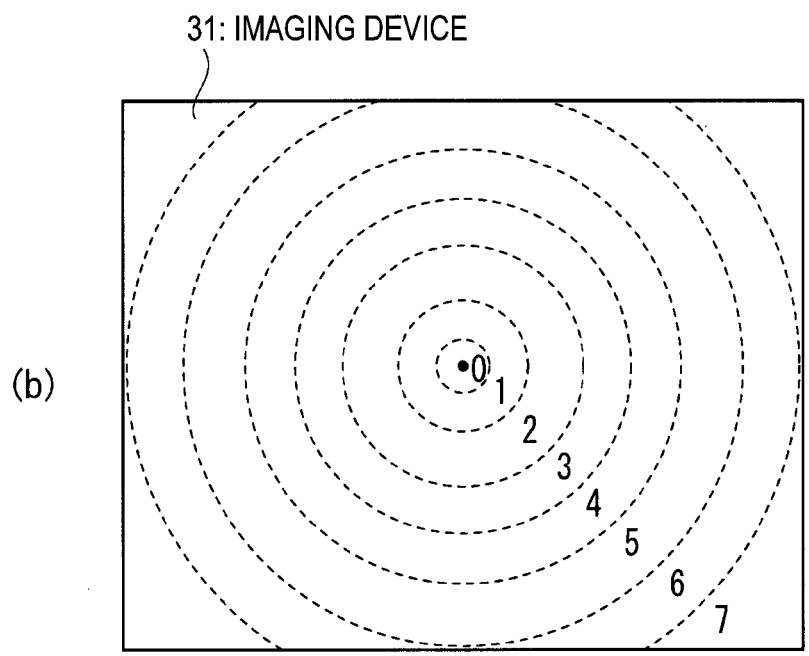

Therefore, in the embodiment, as shown in (b) of FIG. 6, the light receiving surface of the solid-state imaging device 31 is grouped into eight lens image height regions (ranges) 0 to 7 in accordance with the distance from the center of the light receiving surface (the position of the optical axis). The correction coefficient selection table exemplified in FIG. 5 is provided for each image height group.

Figure 7:
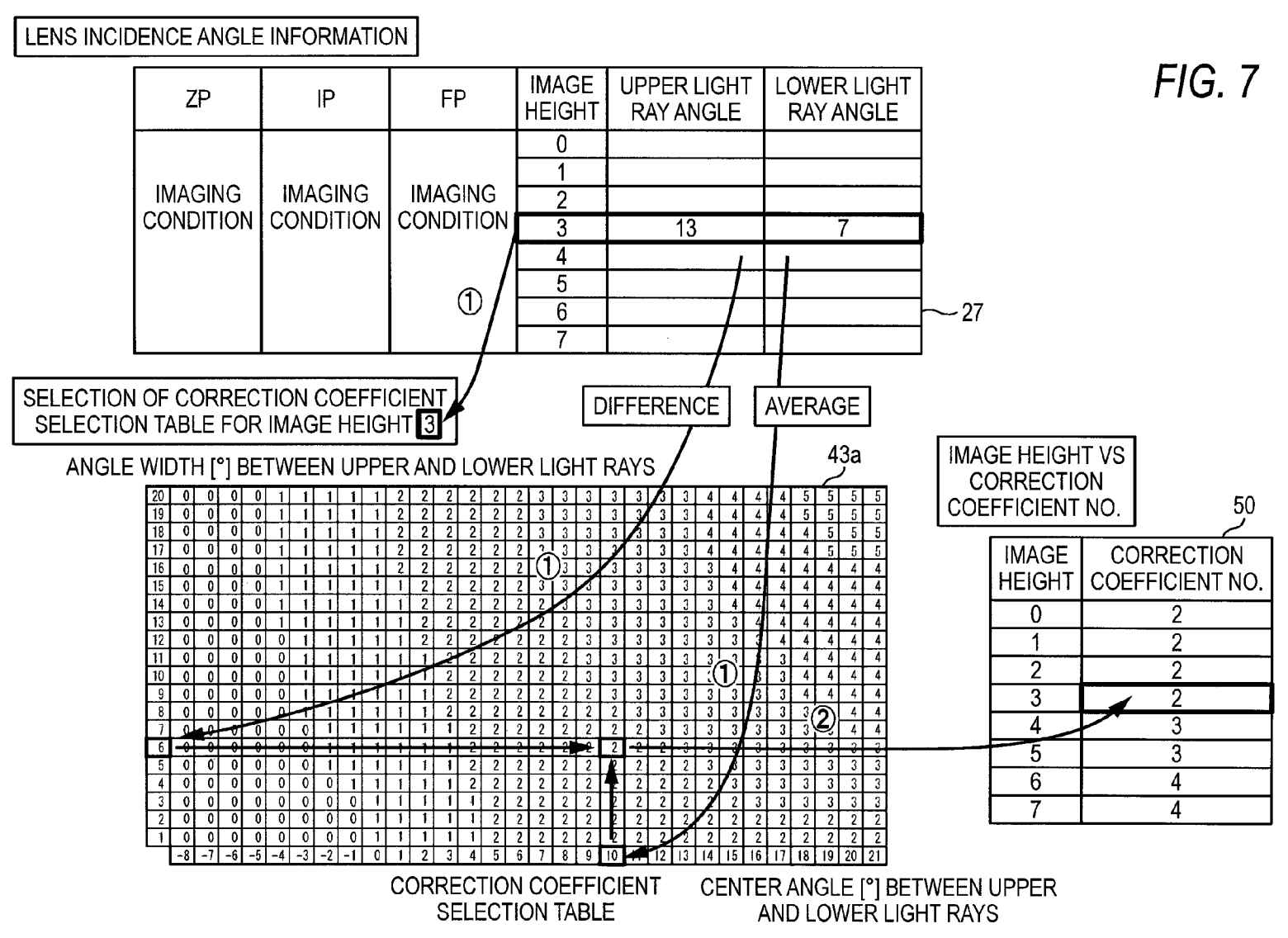

FIG. 7 is a view for explaining an operation for determining correction coefficients for color mixture correction. The CPU 40 in FIG. 2 reads out information about an upper light ray angle and information about a lower light ray angle for each image height from the lens incidence angle information 27 written in advance in the ROM of the interchangeable lens 20. In the illustrated example, only an upper light ray angle 13° (angle between an upper light ray and the normal line of the light receiving surface: first incidence angle) and a lower light ray angle 7° (angle between a lower light ray and the normal line of the light receiving surface: second incidence angle) for an image height 3 are described. However, practically, information about an upper light ray angle and a lower light ray angle for an image height 0, information about an upper light ray angle and a lower light ray angle for an image height 1, . . . , information about an upper light ray angle and a lower light ray angle for an image height 7 are written in advance so that information about the upper and lower light ray angles for each image height can be read out.

Description will be made along the example in which the upper and lower light ray angles for the image height 3 are 13° and 7°. The incidence angle calculating portion 40a in FIG. 2 calculates a difference (13°−7°=6°) between the two angles for calculating an angle width between the upper and lower light rays, and calculates an average value [(13°+7°)÷2=10°] of the two angles for calculating the center angle between the upper and lower light rays.

The correction coefficient selecting portion 43 retrieves the correction coefficient selection table 43a for the image height 3 using the angle width 6° between the upper and lower light rays and the center angle 10° between the upper and lower light rays based on the information of the image height 3 and the aforementioned calculation results 6° and 10°, and obtains a correction coefficient number "2".

Similarly, the correction coefficient selecting portion 43 obtains a correction coefficient number corresponding to the image height 0, . . . , and a correction coefficient number corresponding to the image height 7. Thus, a table 50 in FIG. 7 is completed.

As shown in FIG. 8, a group of correction coefficients [Ra, Ga, Ba] are stored for each correction coefficient number in the correction coefficient storage region 42a of the memory 42 in FIG. 2. FIG. 8 shows an example in which the group of correction coefficients belonging to the correction coefficient number "2" are indicated by %. In the illustrated example, the correction coefficients [Ra, Ga, Ba] for every 20° are provided for each image height when, for example, a line extending in a right horizontal direction from the center of the light receiving surface of the imaging device is regarded as 0° direction and a line extending vertically upward is regarded as 90° direction.

For example, in the 0° direction at the image height 0, the correction coefficient Ra is set by +1% and expressed as Ra=1.01, the correction coefficient Ga is set by ±0% and expressed as Ga=1.00, and the correction coefficient Ba is set by −1% and expressed as Ba=0.99. By use of the correction coefficients, the image signal processing circuit 34 performs color mixture correction.

The color mixture correction is performed, for example, in the following manner. A real detection signal of each red (R) detection pixel located within the range of the image height 3 shown in (b) of FIG. 6 is multiplied by the correction coefficient Ra to thereby obtain a detection signal of the red detection pixel subjected to color mixture correction. Likewise, a real detection signal of each green (G) detection pixel is multiplied by the correction coefficient Ga to thereby obtain a detection signal of the green detection pixel subjected to color mixture correction. A real detection signal of each blue (B) detection pixel is multiplied by the correction coefficient Ba to thereby obtain a detection signal of the blue detection pixel subjected to color mixture correction. Incidentally, the processing method of the color mixture correction is not limited thereto. Alternatively, color mixture correction may be performed in such a manner that an output value of a detection signal of each adjacent pixel adjacent to the periphery of a detection pixel is multiplied by a correction coefficient corresponding to the color of the adjacent pixel and the product obtained thus is subtracted from an output value of a detection signal of the detection pixel.

Such color mixture correction calculation is made to correct detection signals of pixels in the range of the image height 0, the range of the image height 1, . . . , the range of the image height 7 based on the table 50. Thus, color mixture correction corresponding to the interchangeable lens 20, i.e. corresponding to the lens incidence angle information of the interchangeable lens 20 can be made.

Although nothing but the example of the upper light ray angle 13° and the lower light ray angle 7° for the image height 3 has been described in the description of FIG. 7, the upper and lower light ray angles corresponding to the image height may have different values from one interchangeable lens to another, as described above. For example, assume that the upper light ray angle and the lower light ray angle for the image height 3 are 16° and 6° respectively in another interchangeable lens. In this case, the difference (the angle width between the upper and lower light rays) is 10° and the average (the center angle between the upper and lower light rays) is 11°. The correction coefficient number corresponding to this is "3". Thus, color mixture correction is to be made by use of correction coefficients belonging to the correction coefficient number 3.

Information about imaging conditions ZP (zoom point: zoom position of the telephoto lens), IP (iris point: diaphragm position) and FP (focus lens position) is also written in the lens incidence angle information 27 shown in the upper half part of FIG. 7. These pieces of information are transmitted to the imaging apparatus body side. In the embodiment, color mixture coefficients are not prepared for each of these imaging conditions (each zoom position, each diaphragm position, and each focus position). Instead, color mixture coefficients are shared for each correction coefficient number determined based on the upper light ray angle and the lower light ray angle for each image height. Therefore, the number of correction coefficients can be reduced. Even when the embodiment is applied to a lens-interchangeable type imaging apparatus, the data volume of correction efficient data to be prepared in advance can be reduced so that the capacity of the memory can be reduced.

Incidentally, although the example where information about the upper light ray angle and the lower light ray angle for each image height is stored on the interchangeable lens side has been described in the aforementioned embodiment, the invention is not limited thereto. For example, lens ID information may be stored in advance on the interchangeable lens 20 side so that the imaging apparatus body side on which the interchangeable lens is mounted can read the lens ID information. Configuration may be made so that the lens incidence angle information (the upper light ray angle and the lower light ray angle for each image height group) corresponding to the lens ID information can be calculated by arithmetic processing from lens configuration information stored correspondingly to the lens ID in the memory on the imaging apparatus body side.

Alternatively, the aforementioned arithmetic processing may be performed in advance, and the lens incidence angle information 27 shown in FIG. 7 for each lens ID may be prepared in advance in the memory 42 on the imaging apparatus body 30 side.

In addition, although the example of color mixture correction has been described in the aforementioned embodiment, any other image correction for improvement of image quality may be processed similarly. For example, for color shading correction, correction coefficients are different from one interchangeable lens to another. Therefore it will go well if a distribution of a color shading rate corresponding to FIG. 3 is obtained based on the center angle between the upper and lower light rays and the angle width between the upper and lower light rays, a color shading correction coefficient selection table corresponding to FIG. 5 is prepared correspondingly to the distribution, and color shading correction coefficient data corresponding to FIG. 8 are provided.

Similarly, an unnatural level difference depending on an incidence angle of incident light may appear in a taken image. It is because a difference in incident light sensitivity appears between each pixel and another pixel adjacent thereto due to a manufacturing variation of pixels (photodiodes) formed in a surface portion of a semiconductor substrate, a manufacturing variation of color filters laminated thereon, etc. as the incident light is more oblique. For example, a level difference called a same color level difference appears in the image. In addition, a difference is generated, for example, between light sensitivity of a center pixel of the solid-state imaging device and light sensitivity of each of peripheral pixels thereof. This difference may vary from one interchangeable lens to another. The interchangeable lens dependence of the difference (sensitivity ratio) may be also corrected properly for each interchangeable lens in the same manner as described above.

The quantity of correction coefficients used for each of the aforementioned color mixture correction, the aforementioned color shading correction, the aforementioned level difference correction and the aforementioned sensitivity ratio correction can be reduced. Accordingly, even when the correction coefficients for all the corrections are prepared in advance, the volume of correction coefficient data can be reduced.

Incidentally, although the embodiment in which data exemplified in FIGS. 5 and 8 are held in advance in the region 42a of the memory 42 on the imaging apparatus body side has been described above, configuration may be made in such a manner that distribution data exemplified in FIG. 3 are held in advance and the CPU 40 calculates data of FIGS. 5 and 8 based on the distribution data.

In the embodiment described in FIG. 7, information about the upper light ray angle and the lower light ray angle is stored correspondingly to each image height as the lens incidence angle information 27. However, information about the upper light ray angle and the lower light ray angle may be stored finely correspondingly to each image height and each F-number, as shown in FIG. 9. When correction coefficients used for each of the corrections are determined correspondingly to the F-number at the time of imaging a photographic subject in this manner, higher image quality can be attained.

FIG. 10 shows tables showing an example in which correction coefficients differ from one F-number to another. The table in the lower half part is the same as that in FIG. 5, showing correction coefficient numbers when, for example, the F-number is 2.0. On the other hand, the table in the upper half part of FIG. 10 exemplifies correction coefficient numbers when the F-number is 1.4. Even when the upper and lower light ray angles are the same as shown in FIG. 9, proper correction parameters (correction coefficient numbers) may be different according to the F-numbers.

Figure 11:
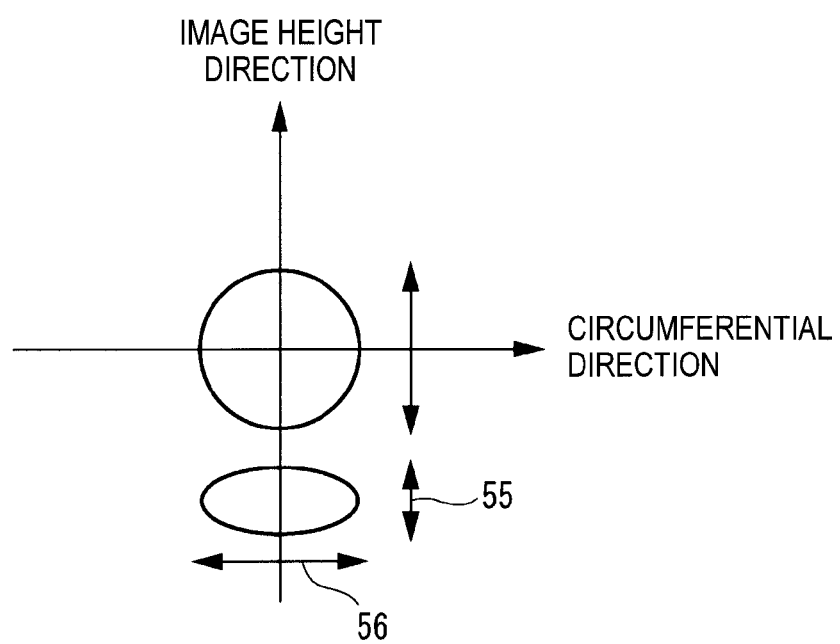
FIG. 11 A view showing incidence angle characteristic in a circumferential direction and an image height direction.

For example, assume that angle widths of a light condensing portion of a pencil of light rays are obtained in the image height direction and the circumferential direction, as shown in FIG. 11. In this case, of characteristics about the light condensing angle in the light condensing portion, the angle width in the image height direction and the angle width in the circumferential direction coincide with each other (depicted as a circle in the center of FIG. 11) as long as the pencil of light rays is incident on the light receiving surface of the imaging device vertically. However, when the pencil of incident light rays is incident obliquely so that the light condensing position is deviated in the image height direction, of the characteristics about the light condensing angle in the light condensing portion, the angle width in the image height direction is narrowed to be oblate while the angle width in the circumferential direction does not change much.

In the aforementioned embodiment, correction coefficients are determined based on an angle width (angle width between upper and lower light rays) 55 in the image height direction in FIG. 11 without depending on an angle width 56 in the circumferential direction. In the embodiment in FIG. 9, correction coefficients are determined also depending on the angle width 56 in the circumferential direction. In the oblate circle shown in FIG. 11, the angle width 56 in the circumferential direction depends on the F-number. Accordingly, incidence angle information may be set in accordance with the F-number as shown in FIG. 9.

Incidentally, F-number=1.4, F-number=2.0, F-number= . . . are set separately in FIG. 9. When the F-number is large, for example, not smaller than 4, the fluctuation quantity of the angle width 56 in the circumferential direction may be too small to give a great influence on the correction coefficients even if the angle width 56 in the circumferential direction fluctuates. Therefore, these large F-numbers may be put together into one entry of information about the upper and lower light ray angles.

As described above, according to the aforementioned embodiment, the correction coefficients are classified into groups (classified into groups in accordance with respective correction coefficient numbers in the example of FIG. 8) and which group and which correction coefficients to select are determined based on information about the light condensing angle in the light condensing portion of the pencil of light rays. Accordingly, image correction can be performed properly by use of the reduced data volume of correction coefficients.

As described above in the aforementioned embodiment, color mixture characteristic or color shading characteristic fluctuates remarkably in the condition that both the center angle and the angle width between the upper and lower light rays are severe, as apparent from the distribution graph exemplified in FIG. 3. In the aforementioned embodiment, the distribution is mapped using the center angle and the angle width between the upper and lower light rays, so that a region where the correction coefficient fluctuates gently and a region where the correction coefficient fluctuates steeply can be made compatible, and high speed processing and correction accuracy can be made compatible without the necessity of preparing redundant correction coefficients.

In recent years, mirrorless interchangeable-lens cameras have been widespread. However, in such a mirrorless interchangeable-lens camera, a flange back length (a distance between a lens mount portion and an imaging device) is generally so short that an incidence angle onto the imaging device tends to be oblique easily. Particularly, an oblique incidence component onto a peripheral portion of the imaging device changes largely according to the kind of lens. Therefore, color shading characteristic or color mixture characteristic also changes remarkably according to the kind of lens. In the aforementioned embodiment, robust correction coefficients can be provided in the peripheral portion of the imaging device. Accordingly, it is possible to attain an imaging apparatus which is high in toughness to optical conditions. There is an advantage that a degree of freedom can be given to the size or structure of the interchangeable lens.

Incidentally, although a lens-interchangeable type imaging apparatus has been described by way of example in the aforementioned embodiment, it is a matter of course that the invention may be applied to a lens non-interchangeable type imaging apparatus in which an imaging lens is mounted integrally on an imaging apparatus body. In this case, the number of kinds of imaging lenses is one, and which imaging lens is in use is known on the imaging apparatus body side. Therefore, lens incidence angle information may be stored in advance on the imaging apparatus body side.

As described above, an imaging apparatus according to an embodiment is an imaging apparatus including a condenser lens optical system and a solid-state imaging device so that a pencil of incident light rays passing through the condenser lens optical system and then incident on the solid-state imaging device can be converged in a conical shape with a result that an image of the pencil of incident light rays can be formed on one point of a light receiving surface of the solid-state imaging device due to light condensing effect of the condenser lens optical system, characterized in that:

the imaging apparatus further includes a correcting portion which performs image quality correction on a taken image signal outputted from the solid-state imaging device in accordance with set correction quantities; and each of the correction quantities is defined in accordance with an image height direction angle width and an incidence angle, the image height direction angle width serving as an angle width between two light rays obtained when a peripheral wall surface of the conical shape of the pencil of light rays intersects with a plane which passes through the center of the light receiving surface of the solid-state imaging device and which is perpendicular to the light receiving surface, the incidence angle serving as an angle between a center line bisecting the image height direction angle width and a normal line of the light receiving surface.

In addition, the imaging apparatus according to the embodiment is characterized in that:

the imaging apparatus further includes an imaging lens which has the condenser lens optical system and a diaphragm, and an imaging apparatus body on which the imaging lens is mounted; and the imaging apparatus body includes:

a storage portion which stores the correction quantities; and a correction quantity selecting portion which retrieves data stored in the storage portion based on incidence angle information of the imaging lens about the image height direction angle width and the incidence angle, and obtains a corresponding correction quantity.

In addition, the imaging apparatus according to the embodiment is characterized in that:

the incidence angle information includes information about a first incidence angle serving as an angle between one of the two light rays and a normal line of the light receiving surface and a second incidence angle serving as an angle between the other light ray and the normal line of the light receiving surface.

In addition, the imaging apparatus according to the embodiment is characterized in that: when distances between the center of the light receiving surface of the solid-state imaging device and light condensing positions of the pencil of incident light rays are set as image heights;

the storage portion stores the correction quantities classified into groups in accordance with the image heights; and the correction quantity selecting portion selects a corresponding correction quantity from the storage portion based on the incidence angle information classified into groups in accordance with the image heights.

In addition, the imaging apparatus according to the embodiment is characterized in that: when distances between the center of the light receiving surface of the solid-state imaging device and light condensing positions of the pencil of incident light rays are set as image heights;

the storage portion stores the correction quantities classified into groups in accordance with the image heights; and the correction quantity selecting portion selects a corresponding correction quantity from the storage portion based on the incidence angle information classified into groups in accordance with the image heights and F-numbers of the lens.

In addition, the imaging apparatus according to the embodiment is characterized in that: the correction quantities stored in the storage portion are obtained from a distribution of an image quality deterioration rate of the taken image signal, using a value of the image height direction angle width and a value of the incidence angle as coordinates.

In addition, the imaging apparatus according to the embodiment is characterized in that: an angle between a line of the center of gravity of a distribution of an incidence angle within the image height direction angle width and a normal line of the light receiving surface is used in place of the incidence angle of the center line.

In addition, the imaging apparatus according to the embodiment is characterized in that: the distribution of the image quality deterioration rate is any one of a distribution of a color mixture rate, a distribution of a color shading rate, a distribution of a color level difference in a taken image, and a distribution of light sensitivity in each pixel of the solid-state imaging device.

In addition, the imaging apparatus according to the embodiment is characterized in that: the imaging lens is placed as a non-interchangeable type on the imaging apparatus body.

In addition, the imaging apparatus according to the embodiment is characterized in that: the imaging lens is an interchangeable lens mounted detachably on the imaging apparatus body.

In addition, the imaging apparatus according to the embodiment is characterized in that: the interchangeable lens has a memory which stores the incidence angle information of the interchangeable lens; and the imaging apparatus body has a control portion which reads the incidence angle information from the memory when the interchangeable lens is mounted on the imaging apparatus body.

In addition, the imaging apparatus according to the embodiment is characterized in that: the interchangeable lens has a memory which stores ID information for identifying the interchangeable lens; and the imaging apparatus body has a control portion which acquires the ID information from the memory and calculates the incidence angle information of the interchangeable lens based on the ID information when the interchangeable lens is mounted on the imaging apparatus body.

In addition, an interchangeable lens in an imaging apparatus according to an embodiment is characterized by being the aforementioned interchangeable lens.

In addition, an imaging apparatus body in an imaging apparatus according to an embodiment is characterized by being the aforementioned imaging apparatus body.

In addition, an image quality correction method of an imaging apparatus according to an embodiment is an image quality correction method of an imaging apparatus for performing image quality correction on a taken image signal outputted from a solid-state imaging device in accordance with set correction quantities in the imaging apparatus which has a condenser lens optical system and the solid-state imaging device so that a pencil of incident light rays passing through the condenser lens optical system and then incident on the solid-state imaging device can be converged in a conical shape with a result that an image of the pencil of incident light rays can be formed on one point of a light receiving surface of the solid-state imaging device due to light condensing effect of the condenser lens optical system; the method being characterized by including:

defining each of the correction quantities in accordance with an image height direction angle width and an incidence angle, the image height direction angle width serving as an angle width between two light rays obtained when a peripheral wall surface of the conical shape of the pencil of light rays intersects with a plane which passes through the center of the light receiving surface of the solid-state imaging device and which is perpendicular to the light receiving surface, the incidence angle serving as an angle between a center line bisecting the image height direction angle width and a normal line of the light receiving surface.

According to the aforementioned embodiment, each correction quantity for color mixture correction, color shading correction, etc. is determined in accordance with information about a light condensing angle in a light condensing portion of a pencil of incident light rays. Accordingly, deterioration of image quality caused by oblique incident light can be corrected properly. Further, the correction can be made with a smaller data volume than when each correction quantity is determined for each zoom position, each diaphragm position and each focus position.

INDUSTRIAL APPLICABILITY

According to the invention, deterioration of image quality caused by oblique incident light can be corrected properly. Accordingly, the invention is useful when it is applied to an imaging apparatus in which incident light is incident on an imaging device at a large angle.

The present application is based on Japanese Patent Application No. 2011-288031 filed on Dec. 28, 2011, the contents of which will be incorporated herein by reference.

REFERENCE SIGNS LIST 10 lens-interchangeable type imaging apparatus
20 interchangeable lens
21 diaphragm (iris)
22 focus lens
27 lens incidence angle information (incident light ray pencil incidence angle information)
30 imaging apparatus body
31 solid-state imaging device
34 image signal processing circuit
40 CPU
40a incidence angle calculating portion
memory
42a correction coefficient storage region
43 correction coefficient selecting portion
43a correction coefficient selection table

The invention claimed is:

1. An imaging apparatus comprising a condenser lens optical system and a solid-state imaging device so that a pencil of incident light rays passing through the condenser lens optical system and then incident on the solid-state imaging device can be converged in a conical shape with a result that an image of the pencil of incident light rays can be formed on one point of a light receiving surface of the solid-state imaging device due to light condensing effect of the condenser lens optical system, wherein:

the imaging apparatus further comprises a correcting portion which performs image quality correction on a taken image signal outputted from the solid-state imaging device in accordance with set correction quantities; and each of the correction quantities is defined in accordance with an image height direction angle width and an incidence angle, the image height direction angle width serving as an angle width between two light rays obtained when a peripheral wall surface of the conical shape of the pencil of light rays intersects with a plane which passes through the center of the light receiving surface of the solid-state imaging device and which is perpendicular to the light receiving surface, the incidence angle serving as an angle between a center line bisecting the image height direction angle width and a normal line of the light receiving surface.

2. The imaging apparatus according to claim 1, wherein:

the imaging apparatus further comprises an imaging lens which has the condenser lens optical system and a diaphragm, and an imaging apparatus body on which the imaging lens is mounted; and the imaging apparatus body includes:

a storage portion which stores the correction quantities; and a correction quantity selecting portion which retrieves data stored in the storage portion based on incidence angle information of the imaging lens about the image height direction angle width and the incidence angle, and obtains a corresponding correction quantity.

3. The imaging apparatus according to claim 2, wherein:

the incidence angle information includes information about a first incidence angle serving as an angle between one of the two light rays and a normal line of the light receiving surface and a second incidence angle serving as an angle between the other light ray and the normal line of the light receiving surface.

4. The imaging apparatus according to claim 2, wherein:

when distances between the center of the light receiving surface of the solid-state imaging device and light condensing positions of the pencil of incident light rays are set as image heights;

the storage portion stores the correction quantities classified into groups in accordance with the image heights; and the correction quantity selecting portion selects a corresponding correction quantity from the storage portion based on the incidence angle information classified into groups in accordance with the image heights.

5. The imaging apparatus according to claim 2, wherein:

when distances between the center of the light receiving surface of the solid-state imaging device and condensing positions of the pencil of light rays are set as image heights;

the storage portion stores the correction quantities classified into groups in accordance with the image heights; and the correction quantity selecting portion selects a corresponding correction quantity from the storage portion based on the incidence angle information classified into groups in accordance with the image heights and F-numbers of the lens.

6. The imaging apparatus according to claim 2, wherein:

the correction quantities stored in the storage portion are obtained from a distribution of an image quality deterioration rate of the taken image signal, using a value of the image height direction angle width and a value of the incidence angle as coordinates.

7. The imaging apparatus according to claim 6, wherein:

an angle between a line of the center of gravity of a distribution of an incidence angle within the image height direction angle width and a normal line of the light receiving surface is used in place of the incidence angle of the center line.

8. The imaging apparatus according to claim 6, wherein:

the distribution of the image quality deterioration rate is any one of a distribution of a color mixture rate, a distribution of a color shading rate, a distribution of a color level difference in a taken image, and a distribution of light sensitivity in each pixel of the solid-state imaging device.

9. The imaging apparatus according to claim 2, wherein:

the imaging lens is placed as a non-interchangeable type on the imaging apparatus body.

10. The imaging apparatus according to claim 2, wherein:

the imaging lens is an interchangeable lens mounted detachably on the imaging apparatus body.

11. The imaging lens according to claim 10, wherein:

the interchangeable lens has a memory which stores the incidence angle information of the interchangeable lens; and the imaging apparatus body has a control portion which reads the incidence angle information from the memory when the interchangeable lens is mounted on the imaging apparatus body.

12. The imaging apparatus according to claim 10, wherein:

the interchangeable lens has a memory which stores ID information for identifying the interchangeable lens; and the imaging apparatus body has a control portion which acquires the ID information from the memory and calculates the incidence angle information of the interchangeable lens based on the ID information when the interchangeable lens is mounted on the imaging apparatus body.

13. The interchangeable lens in the imaging apparatus according to claim 10.

14. The imaging apparatus body in the imaging apparatus according to claim 10.

15. An image quality correction method of an imaging apparatus for performing image quality correction on a taken image signal outputted from a solid-state imaging device in accordance with set correction quantities in the imaging apparatus which has a condenser lens optical system and the solid-state imaging device so that a pencil of incident light rays passing through the condenser lens optical system and then incident on the solid-state imaging device can be converged in a conical shape with a result that an image of the pencil of incident light rays can be formed on one point of a light receiving surface of the solid-state imaging device due to light condensing effect of the condenser lens optical system; the method comprising:

defining each of the correction quantities in accordance with an image height direction angle width and an incidence angle, the image height direction angle width serving as an angle width between two light rays obtained when a peripheral wall surface of the conical shape of the pencil of light rays intersects with a plane which passes through the center of the light receiving surface of the solid-state imaging device and which is perpendicular to the light receiving surface, the incidence angle serving as an angle between a center line bisecting the image height direction angle width and a normal line of the light receiving surface.

* * * * *